United States Patent [19]

Miyata et al.

[11] Patent Number: 5,796,495
[45] Date of Patent: Aug. 18, 1998

[54] IMAGE INPUT EQUIPMENT

[75] Inventors: Masami Miyata; Yoshikazu Ohara, both of Nagoya, Japan

[73] Assignee: Elmo Co., Ltd., Aichi, Japan

[21] Appl. No.: 297,590

[22] Filed: Aug. 29, 1994

[30] Foreign Application Priority Data

Aug. 31, 1993 [JP] Japan .................................. 5-240389

[51] Int. Cl.$^6$ .............................. H04N 1/40; H04N 1/04
[52] U.S. Cl. .......................... 358/471; 358/475; 358/474
[58] Field of Search .................................. 358/400, 401,
358/474, 475, 494, 497, 471, 446, 468,
487; 355/228, 229, 67; 362/98, 99, 253,
234

[56] References Cited

U.S. PATENT DOCUMENTS

| | | | |
|---|---|---|---|
| 4,737,857 | 4/1988 | Rucci et al. | 358/474 |
| 4,893,196 | 1/1990 | Koshiyouju et al. | 358/494 |
| 4,910,601 | 3/1990 | Gerlach | 358/474 |
| 5,038,227 | 8/1991 | Koshiyouji et al. | 358/474 |

Primary Examiner—Edward L. Coles, Sr.
Assistant Examiner—Thomas D. Lee
Attorney, Agent, or Firm—Koda and Androlia

[57] ABSTRACT

An image input equipment including a stage having a diffusion board provided on an upper surface thereof on which an object is to be placed, an image input head for inputting an image of the object and photoelectrically converting the image into an electric signal, a supporting pillar for supporting the image input head and positioning the image input head over the stage, exterior illumination lamps for illuminating the object placed on the stage from above the stage, interior illumination lamps for illuminating the object placed on the diffusion board from inside the diffusion board. The image input equipment is further provided with lighting circuits and a changeover device. The lighting circuits are used to activate both the exterior illumination lamps and the interior illumination lamps. The changeover device connects the lighting circuits to only either the exterior illumination lamps or the interior illumination lamps selectively.

1 Claim, 4 Drawing Sheets

IMAGE INPUT EQUIPMENT

BACKGROUND OF THE INVENTION

The present invention relates to an image input equipment and more particularly to the equipment which input an image of an object placed on a stage, photoelectrically converts the image into an electric signal, and reproduces the image of the object on video image reproduction means, such as a monitor television.

An image input equipment of this type is disclosed by Japanese Publication of Unexamined Patent Application No.1-316075 filed by the applicant inventor of the present application. This image input equipment comprises a stage having a diffusion board provided on an upper surface thereof, said stage on which an object is to be placed, an image input head for inputting an image of the object and photoelectrically converting the image into an electric signal, a supporting pillar for supporting the image input head and positioning the image input head over the stage, exterior illumination lamps for illuminating the object placed on the stage from above the stage, and interior illumination lamps for illuminating the object placed on the diffusion board from inside the diffusion board.

According to such a construction of the conventional image input equipment, when the exterior illumination lamps are used to illuminate the semi-transparent object, such as a slide film, from above the stage to reproduce a video image of the object, the exterior illumination lamps may illuminate the object unevenly due to an irregular reflection. Thus, using the interior illumination lamps, the object can be illuminated evenly from inside the diffusion board, so that reproduction of a vivid video image of the object is possible.

The conventional image input equipment has two kinds of high-frequency lighting circuits provided to supply required high-frequency voltage to the exterior illumination lamps and the interior illumination lamps. Accordingly, a cost and a space for the lighting circuit are increased.

Further, when picking up the semi-transparent object, such as a slide film, only the interior illumination lamps are normally used. Meanwhile, when picking up the opaque object, the interior illumination lamps are not useful to illuminate the opaque object.

Thus, two kinds of the illumination lamps are not used simultaneously.

Therefore, the lighting circuits are not needed to be provided in the exterior illumination lamps and the interior illumination lamps, respectively.

In view of the foregoing, it is an object of the present invention to provide an image input equipment in which a production cost is reduced.

To attain the above object, the image input equipment of claim 1 the present invention is characterized by comprising: a stage having a diffusion board provided on an upper surface thereof, said stage on which an object is to be placed, an image input head for inputting an image of the object and photoelectrically converting the image into an electric signal, a supporting pillar for supporting the image input head and positioning the image input head over the stage, exterior illumination lamps for illuminating the object placed on the stage from above the stage, interior illumination lamps for illuminating the object placed on the diffusion board from inside the diffusion board, lighting circuits common to turn on the exterior illumination lamps and the interior illumination lamps, and changeover means for connecting the lighting circuits to either the exterior illumination lamps or the interior illumination lamps selectively.

According to the preferred embodiment of the present invention, there is provided means for deactivating the respective exterior illumination lamps or the interior illumination lamps before connecting the lighting circuits to the respective one of the exterior illumination lamps or the interior illumination lamps.

Further, in the image input equipment, the lighting circuits are common to activate the exterior illumination lamps and the interior illumination lamps. Therefore, two kinds of the lighting circuits are not provided. Thus, the cost of the lighting circuits can be sharply reduced and the space in which the lighting circuits is provided can be reduced, which enhances a design freedom Also, the exterior illumination lamps or the interior illumination lamps are deactivated once before the lighting circuits are connected to either the exterior illumination lamps or the interior illumination lamps. Thus, a load of the relay switches or the like is reduced, which results in a longer durability of the image input equipment.

The above and further objects and novel features of the invention will more fully appear from the following detailed description when the same is read in connection with the accompanying drawing it is to be expressly understood however, that the drawing is for purpose of illustration only and is not intended as a definition of the limits of the invention.

DETAILED DESCRIPTION OF THE PREFERRED EMBODIMENT

Figure 1:
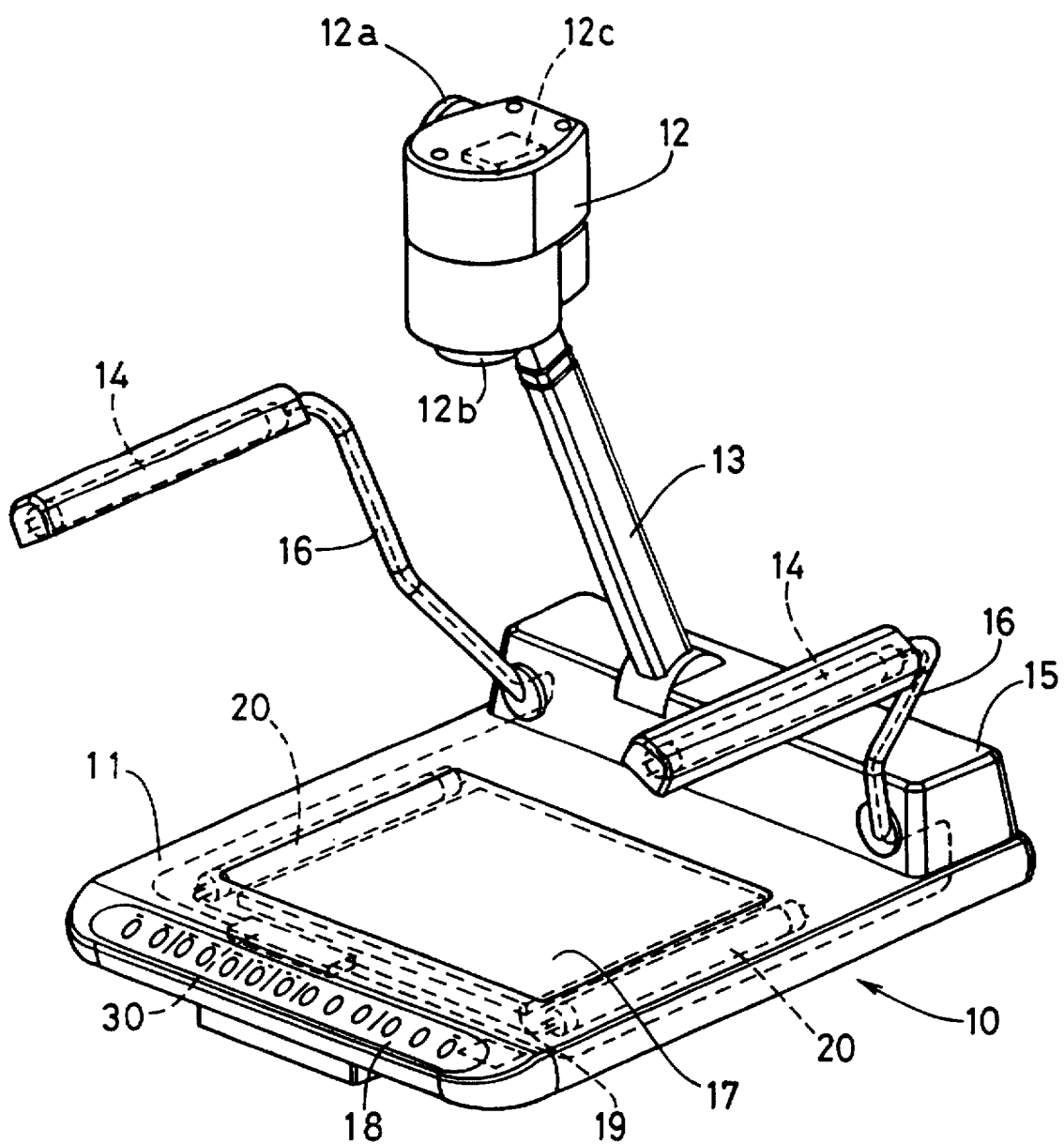
FIG. 1 is a perspective view showing an entire image input equipment according to a preferred embodiment of the present invention.

Referring to the drawings, there is shown an image input equipment 10 according to a preferred embodiment of the present invention. FIG. 1 shows the entire image input equipment 10. The image input equipment 10 comprises a stage 11, an image input head 12, a supporting pillar 13, and a pair of exterior illumination lamps 14, said stage 11 on which an object is to be placed, such as a film, a pamphlet, a book, and a model, said image input head 12 for taking an image of the object placed on the stage 11 and providing video signals of the image of the object, said supporting pillar 13 for supporting the image input head 12 and positioning the image input head 12 over the stage 11, said exterior illumination lamps 14 for illuminating the object from above the stage 11. The image input equipment 10 can be connected to video image reproduction means, such as a monitor television (not illustrated). By connecting the image input equipment 10 to the video image reproduction means, the image of the object can be reproduced on the video image reproduction means. At a rear end of the stage 11 a base 15 is provided. On both ends of the base 15 arms 16 are mounted detachably at ends thereof, said arms 16 for supporting the exterior illumination lamps 14. While the image input equipment 10 is not in use, the arms 16 can be detached from the base 15. Further, on the base 15 the supporting pillar 13 is pivotally assembled at one end thereof. The supporting pillar 13 can be locked in either a raising-up position as illustrated in FIG. 1 or a folding-down position in which the supporting pillar 13 is folded down to the stage 11 due to a locking mechanism (not illustrated).

On the other end of the supporting pillar 13 the image input head 12 is pivotably assembled through a moving mechanism 12a. The image input head 12 has an image input lens 12b and a circuit board 12c built in it. On the circuit board 12c CCD (charge coupled device)is mounted, which device for photoelectrically converting the image of the object formed by the image input lens 12b into an electric signal.

The stage 11 has a rectangular opening formed in a center thereof. In the opening a semi-transparent diffusion board 17 of an acrylate resin is set. On a front end of the stage 10 an operating panel 18 is mounted. In the operating panel 18 various operating switches are disposed.

Inside the stage 10 a light-transmitting board 19 of a acrylate resin is placed, facing the diffusion board 17. At both ends of the light-transmitting board 19 two interior illumination lamps 20 are disposed adjacent to the light-transmitting board 19. When the interior illumination lamps 20 are turned on, the light-transmitting board 19 transmits the light from interior illumination lamps 20 to the diffusion board 17, so that the semi-transparent object placed on the diffusion board 17, such as a film, can be illuminated uniformly. Further, the stage 11 has lighting control means 30 for activating or deactivating the exterior illumination lamps 14 and the interior illumination lamps 20.

Figure 2:
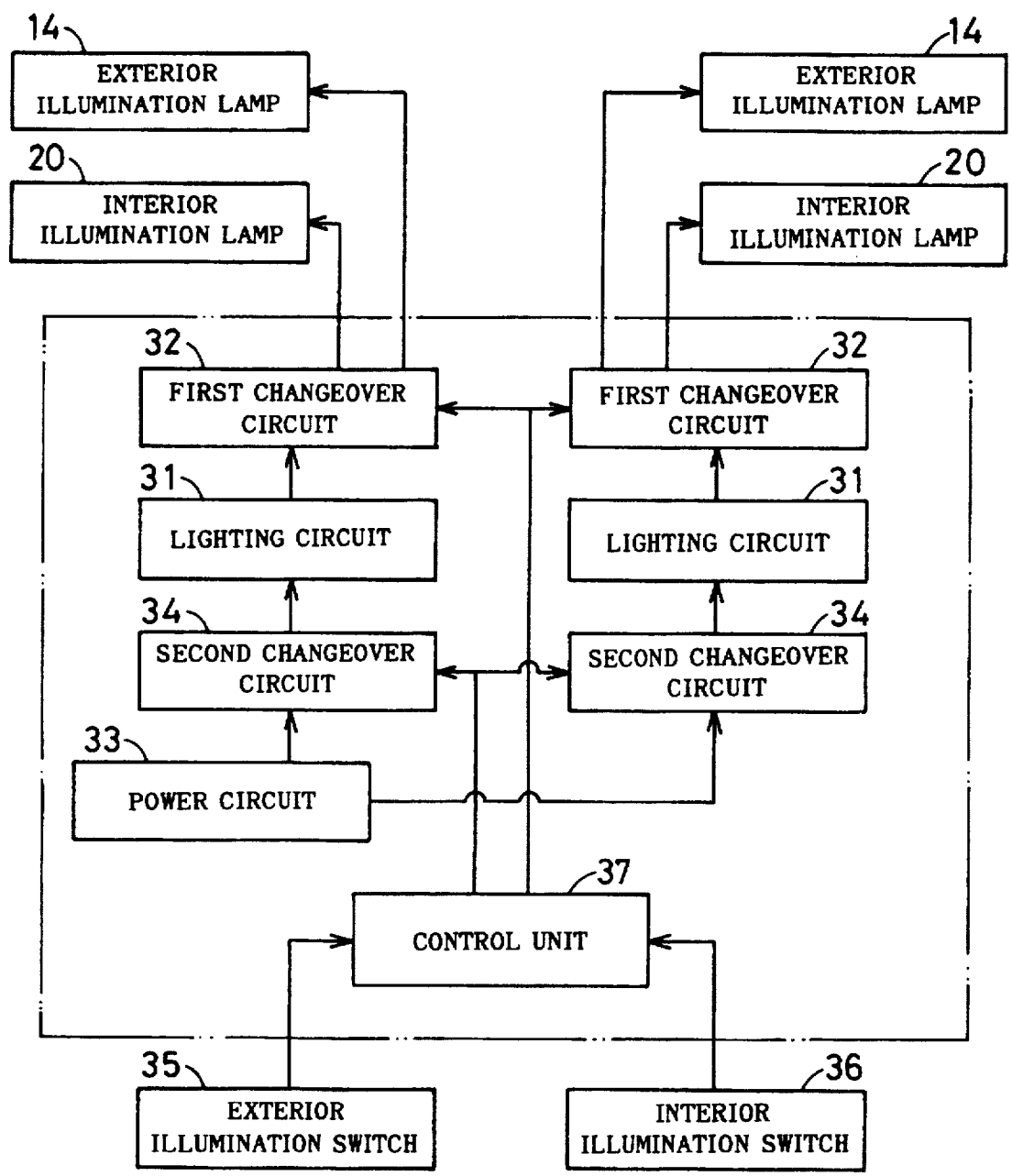
FIG. 2 is a block diagram showing a functional construction of lighting control means of the image input equipment.

FIG. 2 is a block diagram showing a functional construction of the lighting control means 30. The lighting control means 30 comprises a pair of lighting circuits 31, a pair of first changeover circuits 32, a power circuit 33, a pair of second changeover circuits 34, an exterior illumination switch 35, an interior illumination switch 36, and a control unit 37. The lighting circuits 31 are common to activate the exterior illumination lamps 14 and the interior illumination lamps 20. The first changeover circuits 32 connect the lighting circuits 31 to either the exterior illumination lamps 14 or the interior illumination lamps 20. The second changeover circuits 34 convert voltage impressed to the lighting circuits 31 from the power circuits 33 into a high or a low voltage to switch on or off the lighting circuits 31. The exterior illumination switch 35 is operated to activate or deactivate the exterior illumination lamps 14. The interior illumination switch 36 is operated to activate or deactivate the interior illumination lamps 20. The exterior illumination switch 35 and the interior illumination switch 36 are connected to the control unit 37 by an input interface. The first changeover circuits 32 and the second changeover circuits 34 are connected to the control unit 37 by an output interface.

According to such a construction, by switching on the exterior illumination switch 35 or the interior illumination switch 36, the exterior illumination lamps 14 and the interior illumination lamps 20 are activate or deactivate as follows:

If the exterior illumination switch 35 is switched on while the interior illumination lamps 20 are already on, the interior illumination lamps 20 are deactivated if they have already been activated, and are turned on when turned off.

If the interior illumination switch 36 is switched on while the exterior illumination lamps are already activated, the exterior illumination lamps 14 are deactivated if they have already been activated when turned on, and are turned on when turned off.

The first changeover circuits 32 are composed of relay switches. The second changeover circuits 34 are composed of switching transistors. The control unit 37 is a microcomputer, which controls actuation of the first changeover circuit 32 and the second changeover circuit 34 based on a predetermined procedure. The control unit 37 outputs exterior illumination changeover signals or interior illumination changeover signals to the first changeover circuits 32 and outputs light-on signals or light-off signals to the second changeover circuit 34.

When the control unit 37 outputs the exterior illumination changeover signals to the first changeover circuits 32, the lighting circuits 31 are connected to the exterior illumination lamps 14. When the control unit 37 outputs the interior illumination changeover signals to the first changeover circuit 32, the lighting circuits 31 are connected to the interior illumination lamps 20. When the control unit 37 outputs the light-on signals to the second changeover circuit 34, a required high voltage is impressed to the lighting circuits 31 from the power circuit 33, thus turning on the lighting circuits 31. When the control unit 37 outputs the light-off signals to the second changeover circuits 34, a voltage impressed to the lighting circuits 31 from the power circuit 33 drops, thus turning off the lighting circuits 31.

Figure 3:
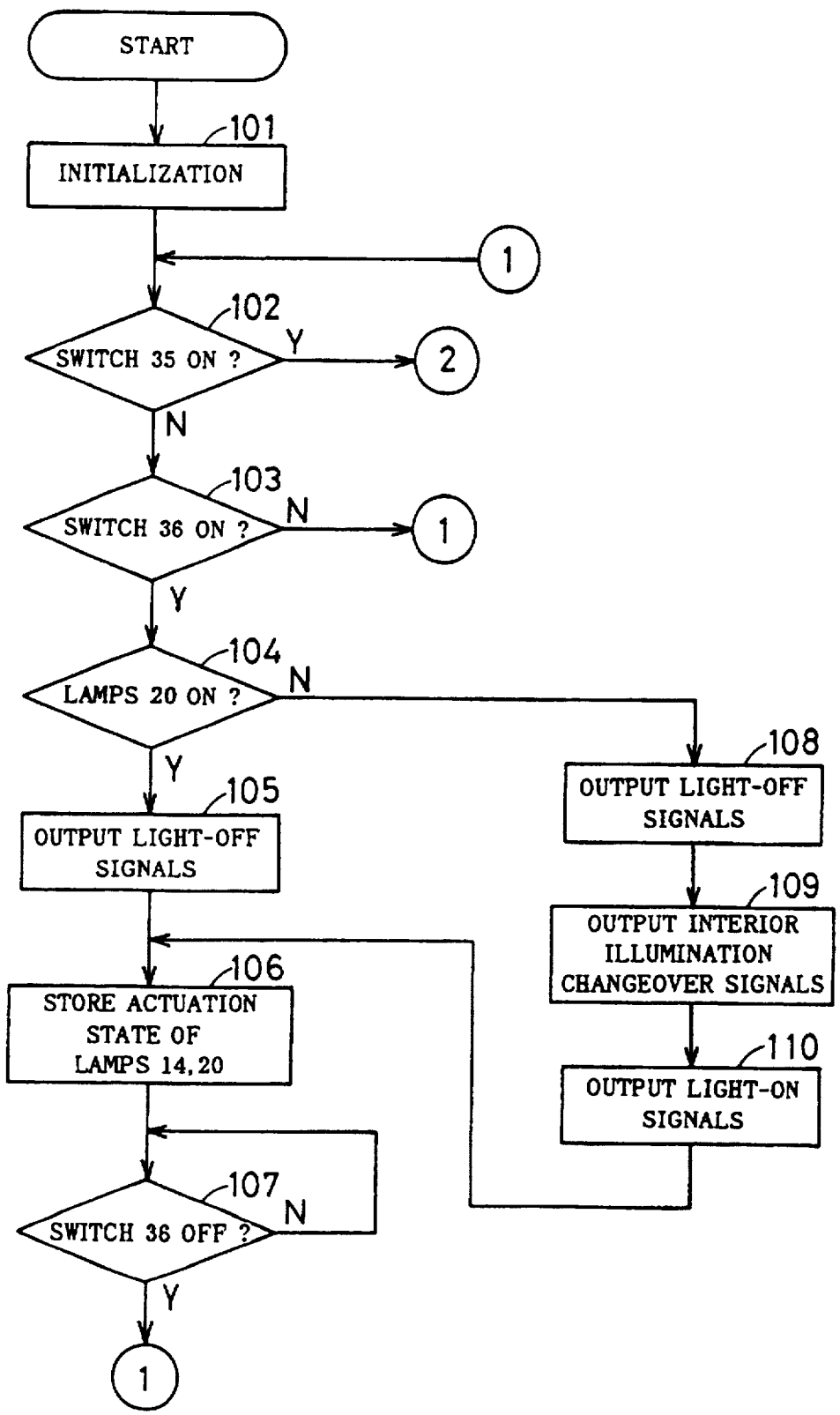
FIG. 3 is a flow chart showing actuation of the lighting control means.
Figure 4:
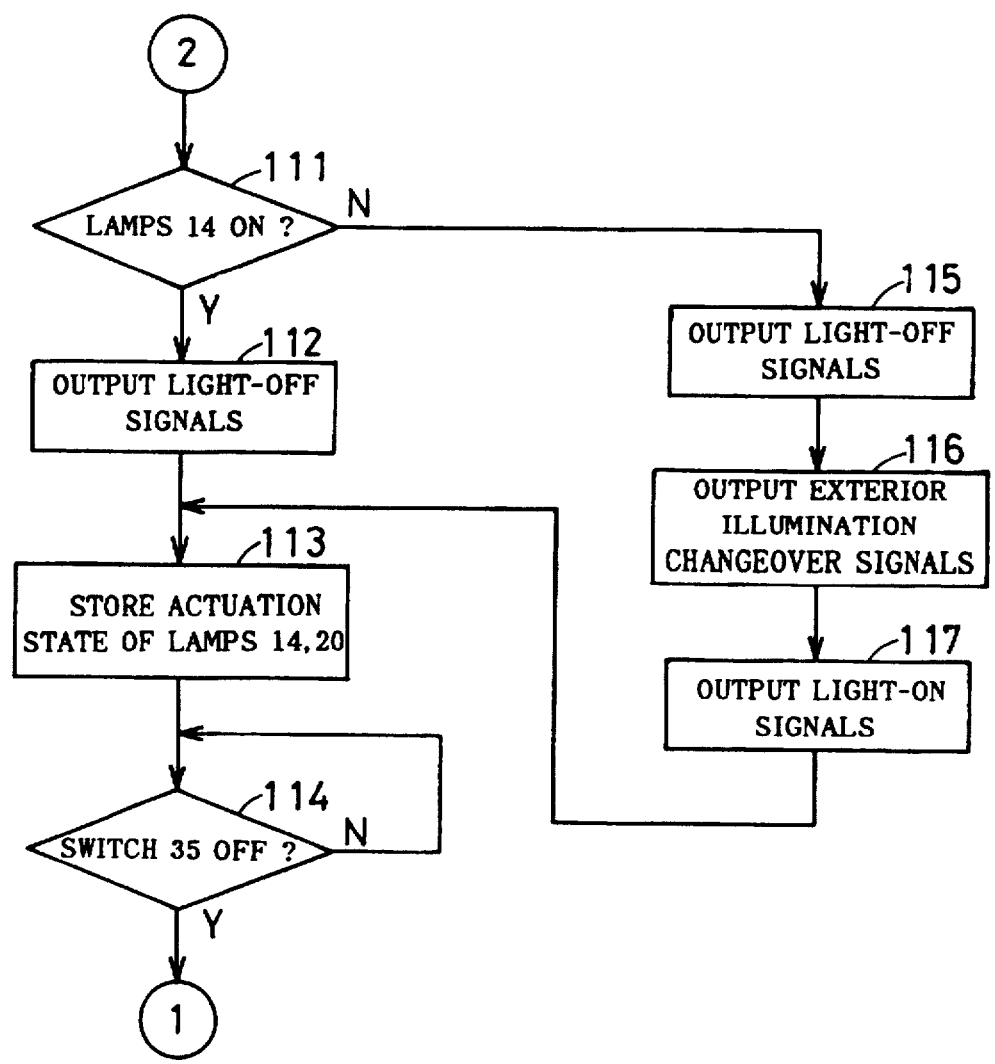
FIG. 4 is a flow chart showing actuation of the lighting control means.

Referring to FIG. 3 and FIG. 4, there is shown procedures for controlling actuation of the exterior illumination lamps 14 and the interior illumination lamps 20 by the control unit 37. When the image input equipment 10 is turned on, initialization is executed in step 101 so that the control unit 37 outputs the light-off signals to the second changeover circuits 34, thus turning off the lighting circuits 31. As a result thereof, both the exterior illumination lamps 14 and the interior illumination lamps 20 are turned off. As mentioned above, the control unit 37 is the microcomputer, whose memory device has an area for storing the actuation state of the exterior illumination lamps 14 and the interior illumination lamps 20 in accordance with the exterior illumination changeover signals, the interior illumination changeover signals, the light-on signals, and the light-off signals output from the control unit 37. That is, while the light-off signals are output to the second changeover circuits 34, it can be determined that the exterior illumination lamps 14 and the interior illumination lamps 20 are deactivated. While the light-on signals are output to the second changeover circuits 34, it can be determined that either of the exterior illumination lamps 14 and the interior illumination lamps 20 is activated or deactivated based on the exterior illumination changeover signals or the interior illumination changeover signals output to the first changeover circuit 32. In step 101 the light-off signals are output to the second changeover circuit 34. Thus, the memory device stores the state that both the exterior illumination lamps 14 and the interior illumination lamps 20 are deactivated.

Next, the process continues to step 102, in which a check is made to determine whether or not the exterior illumination switch 35 is on. If the result of the determination in step 102 is negative (the exterior illumination switch 35 is not operated), the process continues to step 103. In step 103 a check is made to determine whether or not the interior illumination switch 36 is on. If the result of the determination in step 103 is negative (the interior illumination switch 36 is not operated), the process returns to step 102. If the result of the determination in step 103 is positive (the interior illumination switch 36 is operated), the process continues to step 104. In step 104 a check is made to determine whether or not the interior illumination lamps 20 is activated in accordance with the stored data of the memory area. If the result of the determination in step 104 is positive (the interior illumination lamps 20 are activated), the process continues to step 105. In step 105 the light-off signals are output to the second changeover circuits 34 to deactivate the interior illumination lamps 20. The process continues to step 106. In step 106 the actuation state of the exterior illumination lamps 14 and the interior illumination lamps 20 is stored. The process continues to step 107. In step 107 a check is made to determine whether or not the interior illumination lamp switch 36 is off. IF the result of the determination in step 107 is positive (the illumination lamp switch 36 is not operated), the process returns to step 102. The result of the determination in step 107 is negative (the illumination lamps switch 36 is operated), the process remains in step 107.

If the result of the determination in step 104 is negative (the interior illumination lamps 20 are deactivated, the process continues to step 108. In step 108 the light-off signals are output to the second changeover circuits 34, so that the exterior illumination lamps 14 are deactivated even if they are already activated. The process continues to step 109. In step 109 the interior illumination changeover signals are output to the first changeover circuits 32 so that the lighting circuits 31 are connected to the interior illumination lamps 20. The process continues to step 110. In step 110 the light-on signals are output to the second changeover circuits 34, so that the interior illumination lamps 20 are activated. The process continues to step 106.

If the result of the determination in step 102 is positive (the exterior illumination switch 35 is operated), the process continues to step 111. In step 111 a check is made to determine whether or not the exterior illumination lamps 14 are activated. If the result of the determination in step 111 is positive (the exterior illumination lamps 14 are activated), the process continues to step 112. In step 112 the light-off signals are output to the second changeover circuits 34 to deactivate the exterior illumination lamps 14. The process continues to step 113. In step 113 the actuation state of the exterior illumination lamps 14 and the interior illumination lamps 20 is stored. The process continues to step 114. In step 114 a check is made to determine whether or not the exterior illumination switch 35 is on. If the result of the determination in step 114 is positive (the exterior illumination switch 35 is not operated), the process returns to step 102. If the result of the determination in step 114 is negative (the exterior illumination switch 35 is operated), the process remains in step 114.

If the result of the determination in step 111 is negative (the exterior illumination lamps 14 are deactivated), the process continues to step 115. In step 115 the light-off signals are output to the second changeover circuits 34, so that the interior illumination lamps 20 are deactivated even though they are already activated. The process continues to step 116. In step 116 the exterior illumination changeover signals are output to the first changeover circuits 32 so that the lighting circuits 31 are connected to the exterior illumination lamps 14. The process continues to step 117. In step 117 the light-on signals are output to the second changeover circuits 34, so that the exterior illumination lamps 14 activated. The process continues to step 113.

When the interior illumination switch 36 is operated through the above steps 101 to 117, the interior illumination lamps 20 are deactivated when they have already been activated or are activated when they are in a deactivated state.

When the exterior illumination switch 35 is operated through the above steps 101 to 117, the exterior illumination lamps 14 are deactivated when they have already been activated or activated when they are in a deactivated state.

That is, while the interior illumination switch 36 is operated, the exterior illumination lamps 14 are not activated. While the exterior illumination switch 35 is operated on, the interior illumination lamps 20 are not activated. When deactivating the exterior illumination lamps 14 and activating the interior illumination lamps 20 or when deactivating the interior illumination lamps 20 and activating the exterior illumination lamps 14, the light-off signals are output to the second changeover circuit 34 in step 108 or 115. Accordingly, either the exterior illumination lamps 14 or the interior illumination lamps 20 are deactivated even though they are already activated, then either the exterior illumination lamps 14 or the interior illumination lamps 20 are activated. As a result, the exterior and interior illumination lamps 14 and 20 are never simultaneously activated.

According to the above embodiment, the lighting circuits 31 are used to turn on both common to the exterior illumination lamps 14 and the interior illumination lamps 20. Therefore, two kinds of the lighting circuits are not provided. Accordingly, the cost of the lighting circuits can be sharply reduced and the space in which the lighting circuits are to be installed can be reduced, which enhances a design freedom.

Further, before the lighting circuits 31 are connected to the exterior illumination lamps 14 or the interior illumination lamps 20, the exterior illumination lamps 14 or the interior illumination lamps 20 are turned off once. Thus, a load of the relay switches or the like is reduced, which results in a longer durability of the image input equipment.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An image input equipment comprising:
   a stage for holding an object placed thereon, the stage having a diffusion board provided on an upper surface thereof,
   an image input head for inputting an image of the object and photoelectrically converting the image into an electric signal,
   a supporting pillar for supporting the image input head and positioning the image input head over the stage,
   exterior illumination lamps for illuminating the object placed on the stage from above the stage,
   interior illumination lamps for illuminating the object placed on the stage through the diffusion board from inside the stage each interior illumination lamp having the same rated voltage as each exterior illumination lamp,
   exterior illumination switch operable for activating or deactivating the exterior illumination lamps,
   an interior illumination switch operable for activating or deactivating the interior illumination lamps,
   lighting circuits selectively outputting the rated voltage or a low voltage lower than the rated voltage,
   first changeover means for selectively connecting the lighting circuits to either the exterior illumination lamps or the interior illumination lamps,
   second changeover means for switching the voltage output from the lighting circuits between the rated voltage and the low voltage, and control means for controlling the first and second changeover means in accordance with operation of the exterior or interior illumination switches so that when the exterior illumination switch is operated while the exterior illumination lamps are in an activated state, the low voltage is output from the lighting circuits, so that when the exterior illumination switch is operated while the exterior illumination lamps are in a deactivated state, the lighting circuits are connected to the exterior illumination lamps respectively subsequently to output of the low voltage from the lighting circuits, and thereafter, the rated voltage is output from the lighting circuits, so that when the interior illumination switch is operated while the interior illumination lamps are in an activated state, the low voltage is output from the lighting circuits, and so that when the interior illumination switch is operated while the interior illumination lamps are in a deactivated state, the lighting circuits are connected to the interior illumination lamps respectively subsequently to output of the low voltage from the lighting circuits, and thereafter, the rated voltage is output from the lighting circuits.

* * * * *